United States Patent [19]

Lin

[11] Patent Number: 5,026,198
[45] Date of Patent: Jun. 25, 1991

[54] LOCKABLE FOLDING JOINT FOR FOLDAWAY LADDER

[76] Inventor: Ching T. Lin, No. 12 Alley 30 Lane 371, Hwacheng Road, Hsin Chuang City, Taipei Hsien, Taiwan

[21] Appl. No.: 578,797

[22] Filed: Sep. 7, 1990

[30] Foreign Application Priority Data

Jul. 23, 1990 [TW] Taiwan ............................... 79208044

[51] Int. Cl.⁵ .............................................. B25G 3/00
[52] U.S. Cl. ........................................ 403/27; 403/93; 182/163; 16/324
[58] Field of Search ..................... 403/93, 96, 99, 27; 182/163, 164; 16/324, 325, 326

[56] References Cited

U.S. PATENT DOCUMENTS 3,469,277  9/1969  Henrichs et al. ..................... 16/324
4,645,371  2/1987  Wang ..................................... 403/93

*Primary Examiner*—Andrew V. Kundrat
*Attorney, Agent, or Firm*—Berman, Aisenberg & Platt

[57] ABSTRACT

In a lockable folding joint of a ladder having two arms with their flat heads pivoted to one another, a detent block used to engage one of spaced notches of one of the flat heads is held resiliently and firmly by an improved mechanism. The mechanism includes a one-piece curved rod spring which has two opposite arc-shaped rod portions whose one ends are attached to the detent block, two coiled portions formed at another ends of the arc-shaped rod portions and a U-shaped rod portion extending from the coiled portions. A spring plate has a rolled end pivoted to one of the arm with the same pivot pin as the coiled portions. The U-shaped portion depresses the spring plate so that the hook end of the spring plate is engaged tightly with the detent block.

2 Claims, 3 Drawing Sheets

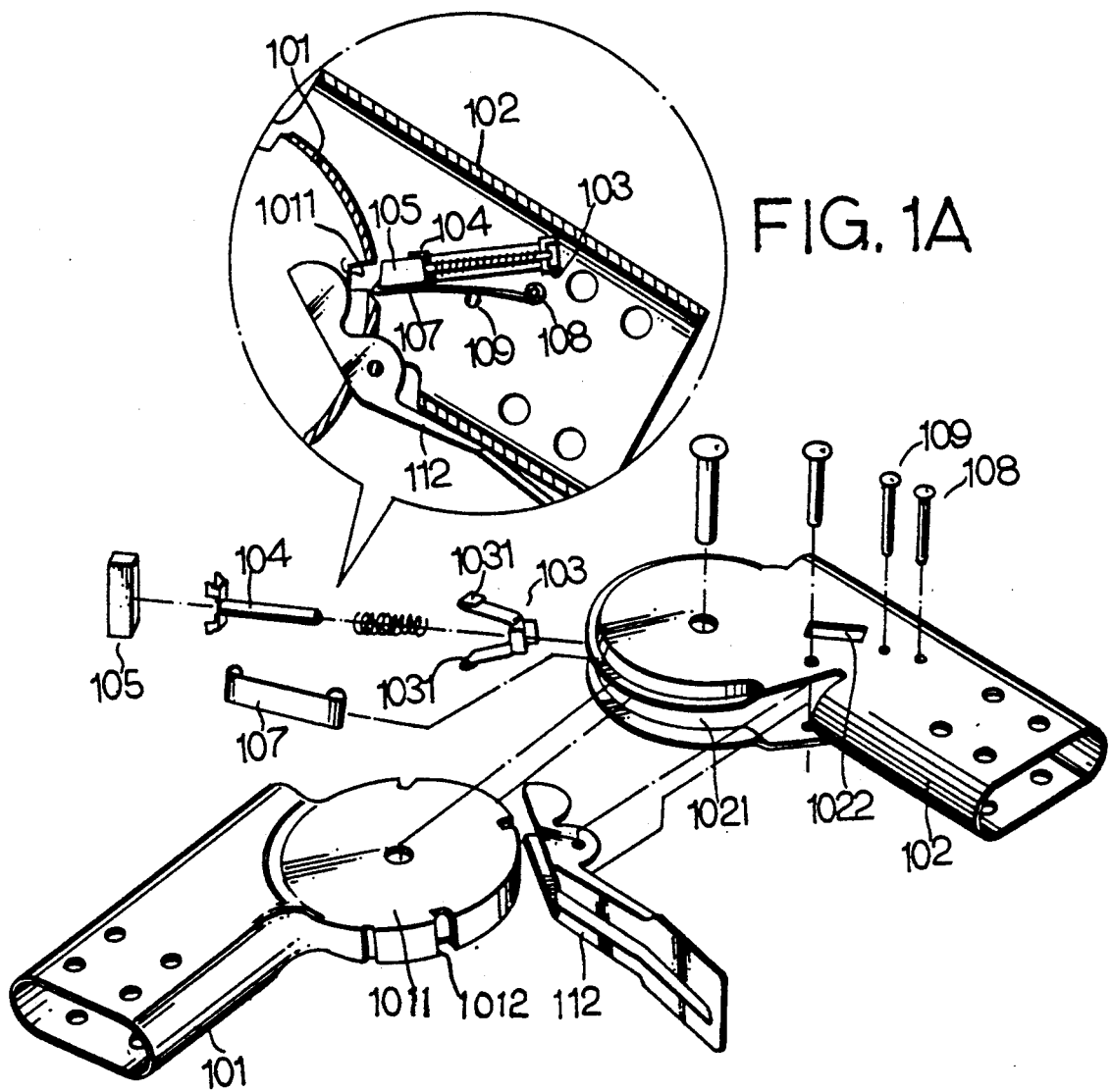
FIG. 1A
PRIOR ART
FIG. 1

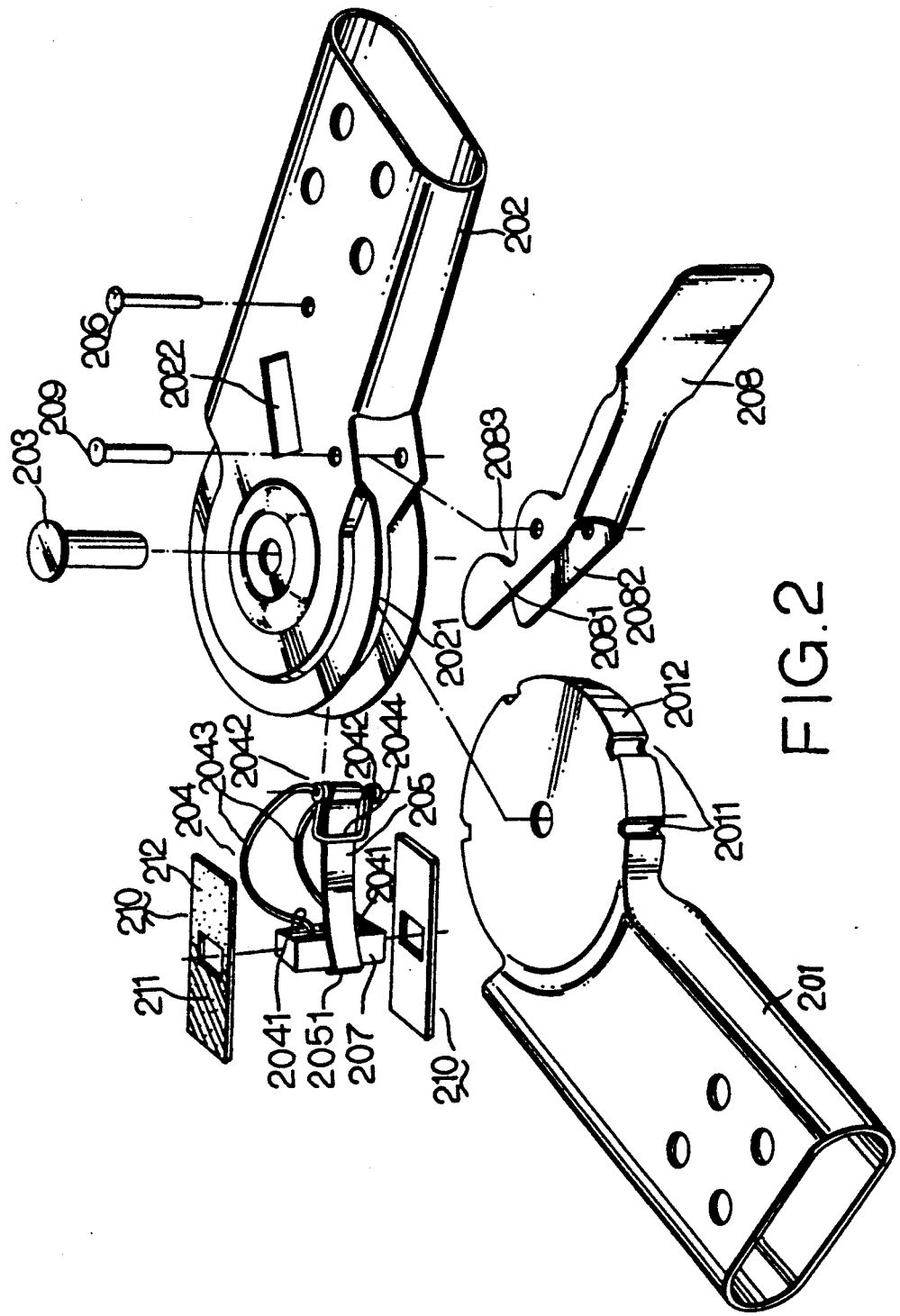
FIG.2

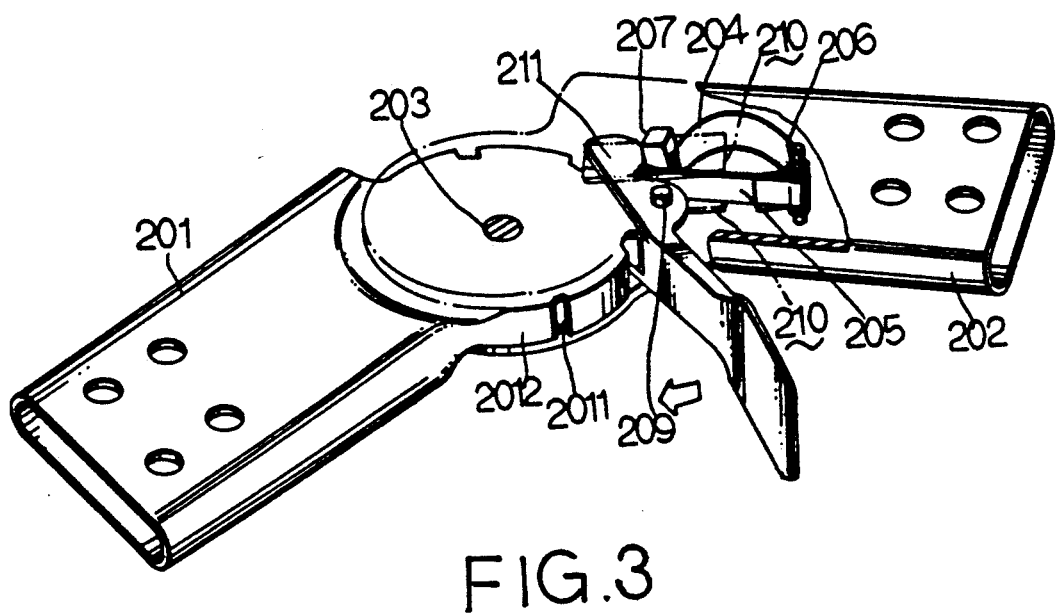
FIG.3
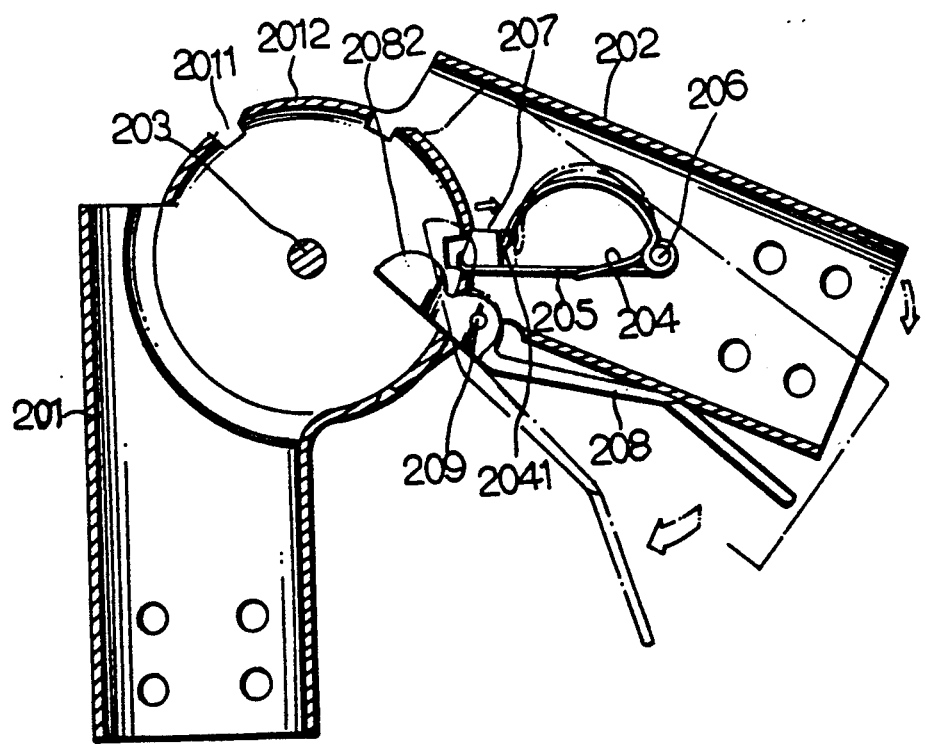
FIG.4

LOCKABLE FOLDING JOINT FOR FOLDAWAY LADDER

BACKGROUND OF THE INVENTION

This invention relates to a folding joint, and particularly to a lockable folding joint for a foldaway ladder.

FIG. 1 shows a conventional folding joint which has two flat hollow arms 101, 102, one of which has a substantially flat head 1011, and the other of which has a forked head 1021. The head 1011 is sandwiched by and pivoted to the forked head forming an angle therebetween. These arms can be locked against one another at any desired angle by means of a detent block 105 which can selectively engage one of the notches 1012 provided in the periphery of the head 101. A mechanism for holding and urging the detent block includes a substantially V-shaped plate member 103 which is mounted in the hollow arm 102 by engaging the hook ends thereof with the edges of apertures 1022 in the arm 102. A spring loaded rod 104 attached to the V-shaped member urges and holds the detent member. A spring plate 107 is attached to a pin 108 with its rolled end and extends to the detent block 105 to hold the detent block against the spring loaded rod 104, thereby holding the detent block resiliently and firmly. A pin 109 is provided to depress the spring plate 107 so as to prevent the hook end of the spring plate 107 from moving away from the detent block 105. This mechanism is complicated and difficult to assemble.

SUMMARY OF THE INVENTION

An object of the invention is to provide a folding joint of the above-mentioned type with a simplified mechanism to urge and hold the detent block.

According to the present invention, an improved mechanism to urge and hold the detent block includes: a one-piece curved spring member having two opposite arc-shaped rod portions, each having a first end attached to the detent block, two coiled portions (each formed at a second end of each of the arc-shaped rod portions opposite to the first end), and a U-shaped rod portion interconnecting the coiled portions and extending from the coiled portions toward the first end; a mounting pin which is disposed across the first hollow arm and inserted into the coiled portions; and a spring plate, which has a rolled end (sleeved around the mounting pin) and a hook end opposite to the rolled end, the spring plate being extended between the U-shaped rod portion and the arc-shaped rod portion and toward the detent block, the hook end holding the detent block against the first ends of the arc-shaped rod portions.

Preferably, two opposite slide plates are attached to the detent block adjacent to the opposite inner surfaces of the first hollow arm, each of the slide plates having a rectangular opening to be fitted to the detent block and at least two colors thereon to present visual indications through the slide apertures of the first hollow arm.

The exemplary preferred embodiment will be described in detail with reference to the accompanying drawings, in which:

BRIEF DESCRIPTION OF THE DRAWINGS

FIG. 1 shows a conventional folding joint for a ladder;

FIG. 2 is an exploded view of a folding joint embodying the present invention;

FIG. 3 is a perspective view of the folding joint of FIG. 2; and

FIG. 4 is a sectional view of the folding joint of FIG. 2.

DETAILED DESCRIPTION OF THE PREFERRED EMBODIMENT

Referring to FIGS. 2 to 4, a folding joint comprises two substantially flat hollow arms 201 and 202, respectively, having heads 2012 and 2021, both of which are substantially flat. The flat head 2021 is forked to sandwich the flat head 2012 and pivoted to the flat head 2012 by means of a pivot stud 203. The periphery of the head 2012 is provided with four engaging notches 2011 at angularly spaced positions. A handling lever 208 is pivoted by a pin 209 to the forked head 2021 and has a forked push portion 2081 extending in between the forked head 2021. Two parallel planar members 2082 of the forked push portion 2081 is slidable on two sides of the head 2012 when the handling lever 208 is operated. A groove 2083 is provided in each planar member 2082. Two oblong apertures 2022 are provided in two sides of the hollow arm 202.

A detent block 207 is movably received in the hollow arm 202 and projects in part outward through the apertures 2022. Two slide plates 210 with rectangular openings are fitted to the block 207 adjacent to the inner sides of the hollow arm 202 so as to move along with the detent block 207. Each slide plate 210 is provided with two colors to present visual indications through the apertures of 2022 of the hollow arm 202. One of the colors shows the unlocked situation of the folding joint and the other shows the locked situation thereof.

A mechanism for holding and urging the detent block 207 comprises a curved spring 204 and a spring plate 205. The curved spring 204 has two opposite curved rod portions 2043 each having one end attached to the detent block 207, two coiled portions 2042 formed at another end of the curved rod portions 2043, and a U-shaped rod portion 2044 interconnecting the coiled portions 2042 and extending from the coiled portions substantially in the direction of a line which interconnects the two ends of one of the arc-shaped rod portions 2043. The coiled portions 2042 are mounted on a pin 206 which is provided across the hollow arm 202. The spring plate 205 extends from the pin 206 to the block 207 and has a rolled end sleeved around the pin 206. A hook end 2051 of the spring plate 205 engages the detent block 207 and holds the same against the ends of the arc-shaped portions 2043. The spring plate 205 is depressed by the U-shaped portion 2044 so that the hook end 2051 does not move away from the detent block 207.

The detent block 207 is normally urged to engage in one of the notches 2011 of the hollow head 201 so as to maintain a certain angle between the arms 201, 202. The angle between the arms can be adjusted by operating the lever 208 to disengage the detent block from the notch, changing the position of the arms and engaging the detent block in the next notch. When the handling lever 208 is turned clockwise, the grooves 2083 of the planar members 2082 engage and depress the detent block 207 so that the detent block is moved away from the notch 2011. In this situation, the arm 202 can be moved relative to the arm 201 to adjust the angle formed between the arms.

The mechanism includes less parts than the mechanism of FIG. 1 and can be assembled easily because only one pivot pin is used to mount the spring plate 205 and the curved spring 204.

With the invention thus explained, it is apparent that numerous modifications and variations can be made without departing from the scope of the invention. It is therefore intended that the invention be limited only as indicated in the appended claims.

I claim:
1. A folding joint for a foldaway ladder comprising:
a substantially flat first hollow arm having a first head which is forked and two opposite slide apertures adjacent to said forked first head,
a substantially flat second hollow arm having a second head which is provided between and pivoted to said forked first head, said second head having a periphery provided with spaced engaging notches,
a detent block movably disposed in said first hollow arm, projecting outward through said slide apertures and urged toward said periphery of said second head so as to engage one of said engaging notches,
means for holding and urging said detent block disposed in said first hollow arm,
a handling lever pivotally mounted to said first hollow arm adjacent to said periphery of said second head, said lever having a push portion extending into said forked first head so as to push said detent block away from one of said notches upon operating said handling lever, and
improvements wherein said holding and urging means includes a one-piece curved spring member having two opposite arc-shaped rod portions each having a first end attached to said detent block, two coiled portions each formed at a second end of each of said arc-shaped rod portions opposite to said first end, and a U-shaped rod portion interconnecting said coiled portions and extending from said cooled portions toward said first end,
said holding and urging means further including a mounting pin which is disposed across said first hollow arm and inserted into said coiled portions, and a spring plate which has a rolled end sleeved around said mounting pin and a hook end opposite to said rolled end, said spring plate being extending between said U-shaped rod portion and said arc-shaped rod portions and toward said detent block, said hook end holding said detent block against said first ends of said arc-shaped rod portions, said U-shaped rod portion providing a measure of pressure on said spring plate so as to enable said hook end to hold said detent block firmly.

2. A folding joint as claimed in claim 1, in which said first hollow arm has two opposite inner surfaces, the improvements further comprising two opposite slide plates attached to said detent block adjacent said opposite inner surfaces, each of said slide plates having a rectangular opening to be fitted to said detent block and at least two colors to present visual indications through said slide apertures.

* * * * *